United States Patent
Ishimoto et al.

(10) Patent No.: US 9,574,081 B2
(45) Date of Patent: Feb. 21, 2017

(54) EPOXY-RESIN COMPOSITION, AND FILM, PREPREG AND FIBER-REINFORCED PLASTIC USING THE SAME

(71) Applicant: Mitsubishi Rayon Co., Ltd., Chiyoda-ku (JP)

(72) Inventors: Tomoko Ishimoto, Toyohashi (JP); Manabu Kaneko, Toyohashi (JP); Kenichi Watanabe, Toyohashi (JP); Yasuhiro Fukuhara, Toyohashi (JP); Sanae Kita, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/413,545

(22) PCT Filed: Aug. 20, 2013

(86) PCT No.: PCT/JP2013/072171
§ 371 (c)(1),
(2) Date: Jan. 8, 2015

(87) PCT Pub. No.: WO2014/030636
PCT Pub. Date: Feb. 27, 2014

(65) Prior Publication Data
US 2015/0191592 A1 Jul. 9, 2015

(30) Foreign Application Priority Data

Aug. 20, 2012 (JP) .................................. 2012-181511

(51) Int. Cl.
| | | |
|---|---|---|
| *C08L 63/00* | (2006.01) | |
| *C08J 5/24* | (2006.01) | |
| *C08G 59/14* | (2006.01) | |
| *C08G 59/40* | (2006.01) | |
| *C08G 59/50* | (2006.01) | |
| *C08J 5/18* | (2006.01) | |

(52) U.S. Cl.
CPC ........... *C08L 63/00* (2013.01); *C08G 59/1477* (2013.01); *C08G 59/1483* (2013.01); *C08G 59/4021* (2013.01); *C08G 59/504* (2013.01); *C08J 5/18* (2013.01); *C08J 5/24* (2013.01); *C08J 2363/00* (2013.01); *C08J 2363/02* (2013.01); *C08J 2453/00* (2013.01); *C08J 2463/00* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | |
|---|---|---|
| 2004/0034124 A1 | 2/2004 | Court et al. |
| 2006/0035088 A1 | 2/2006 | Takano et al. |
| 2009/0198012 A1 | 8/2009 | Sakata et al. |
| 2011/0184091 A1 | 7/2011 | Mizuki et al. |
| 2012/0035299 A1 | 2/2012 | Arai et al. |
| 2013/0202873 A1 | 8/2013 | Mizuki et al. |
| 2013/0217283 A1* | 8/2013 | Arai ....................... C08G 59/28 442/59 |
| 2013/0217805 A1 | 8/2013 | Hayashi et al. |
| 2014/0309337 A1* | 10/2014 | Nagano ..................... C08J 5/24 523/428 |

(Continued)

FOREIGN PATENT DOCUMENTS

| | | |
|---|---|---|
| JP | 07-002975 A | 1/1995 |
| JP | 08-337707 A | 12/1996 |

(Continued)

OTHER PUBLICATIONS

International Search Report issued Nov. 5, 3013 in PCT/JP2013/072171 Filed Aug. 20, 2013.

*Primary Examiner* — Jeffrey Mullis
(74) *Attorney, Agent, or Firm* — Oblon, McClelland, Maier & Neustadt, L.L.P.

(57) ABSTRACT

The present invention relates to an epoxy-resin composition comprising the following components (A), (B), (C) and (D), a film made of the epoxy resin composition, a prepreg and a fiber-reinforced plastic. The present invention can provide an epoxy-resin composition that cures at a low temperature in a short period of time. Also, the present invention can provide a fiber-reinforced plastic having excellent mechanical characteristics, especially excellent fracture toughness and heat tolerance, is made from the epoxy-resin composition.

component (A): an epoxy resin having a monomer unit represented by formula (1) in the molecule;
component (B): a bifunctional epoxy resin with a number-average molecular weight of at least 600 but no greater than 1300, which does not have a monomer unit represented by formula (1) below in the molecule;
component (C): a triblock copolymer; and
component (D): a curing agent.

[Chemical formula 1]

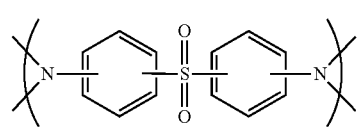

(1)

19 Claims, No Drawings

(56) References Cited

U.S. PATENT DOCUMENTS

2015/0322257 A1* 11/2015 Hirano .................... C08L 63/00
                                                              428/414

FOREIGN PATENT DOCUMENTS

| JP | 09-194611 A | 7/1997 |
|----|----|----|
| JP | 11-005887 A | 1/1999 |
| JP | 2003-535181 A | 11/2003 |
| JP | 2008-031193 A | 2/2008 |
| JP | 2011-074353 A | 4/2011 |
| JP | 2011-079983 A | 4/2011 |
| JP | 4946336 B2 | 6/2012 |
| WO | WO 2004/048435 A1 | 6/2004 |
| WO | WO 2008/001705 A1 | 1/2008 |
| WO | WO 2010/035859 A1 | 4/2010 |
| WO | WO 2010/109929 A1 | 9/2010 |
| WO | WO 2012/039456 A1 | 3/2012 |
| WO | WO 2012/043453 A1 | 4/2012 |
| WO | WO 2013099862 * | 7/2013 |

* cited by examiner

EPOXY-RESIN COMPOSITION, AND FILM, PREPREG AND FIBER-REINFORCED PLASTIC USING THE SAME

FIELD OF THE INVENTION

The present invention relates to epoxy-resin compositions preferred to be used in fiber-reinforced plastics for sports/leisure applications, industrial applications and the like. The present invention also relates to film, prepreg and fiber-reinforced plastics produced by using such epoxy-resin compositions.

The present application is based upon and claims the benefit of priority to Japanese Patent Application No. 2012-181511, filed on Aug. 20, 2012. The entire contents of the application are incorporated herein by reference.

BACKGROUND ART

Because of their lightweight, high strength and rigidity, fiber-reinforced plastics are widely used as fiber-reinforced composite materials in products ranging from sports/leisure applications to industrial applications such as automobiles and aircraft.

Among fiber-reinforced plastics, fiber-reinforced plastic tubes are especially widely used in sports/leisure applications such as fishing rods, golf club shafts, ski poles, bicycle frames and so on. In recent years, improving the fracture toughness of fiber-reinforced plastics in sports/leisure applications has been required to enhance feel during usage or feel when hitting a ball.

A method for producing fiber-reinforced plastics is, for example, using intermediate material (prepreg) formed by impregnating a matrix resin into reinforcing material made of reinforcing fibers such as long fibers. Such a method is useful because the content of reinforcing fibers is easier to control in a fiber-reinforced plastic and a plastic is designed to have a greater amount of reinforcing fibers.

Specific examples of a method for producing a fiber-reinforced plastic from a prepreg are molding using an autoclave, compression molding, internal-pressurizing molding, oven molding and the like. To cure a generic prepreg using such a method, it is usually necessary to thermoset the prepreg by applying heat for approximately two hours. Considering the time for heating or cooling the equipment, a molding die or the like to be used for curing, it takes approximately 2~6 hours, depending on conditions, to cure a prepreg in one molding process. Accordingly, time taken for thermosetting is a factor that increases the cost of molding. In addition, a method has been sought for molding a product at a lower temperature in a shorter period of time so as to achieve mass production of a product.

As a method for shortening the molding time of fiber-reinforced plastics, it is an option to use a highly reactive epoxy-resin composition as a matrix resin so that curing reactions progress by a slight amount of energy, thereby shortening the time for curing the epoxy resin composition. However, if a resin composition is too highly reactive, curing reactions progress even when the composition is stored at room temperature, causing a decrease in the storage stability of the resin composition. Also, if the matrix resin composition cures too quickly, that may cause voids in a molded product produced using a method for molding in a short period of time. Especially, voids tend to remain in a molded product when oven molding (vacuum bag molding) is employed. Voids may be suppressed by lowering the viscosity of the matrix resin composition. However, a prepreg containing a low viscous matrix resin composition tends to be tacky at room temperature and is hard to handle during a production process.

Considering the problems above, epoxy-resin compositions are required to have the following features: properties for producing a molded product at low temperature in a short period of time; processability of a prepreg at room temperature and suppression of voids in a molded product; and excellent mechanical characteristics, especially excellent fracture toughness, when used as a matrix resin to produce fiber-reinforced plastics.

As an example of a prepreg capable of producing molded products at a relatively low temperature in a short period of time, patent publication 1 discloses a prepreg containing an epoxy-resin composition as a matrix resin, where dicyandiamide is used as a latent curing agent, and polyvinyl formal is used as a thermoplastic resin elastomer. Also, patent publication 2 discloses a prepreg formed by using an epoxy-resin composition containing a reaction product of an epoxy resin and an amine compound having a sulfur atom in the molecule.

In addition, to improve fraction toughness of a cured product, numerous methods are proposed using epoxy-resin compositions containing thermoplastic resins. For example, patent publications 3 and 4 each propose to use an epoxy-resin composition with an added polyamide-based thermoplastic elastomer. Also, patent publications 5 and 6 each propose to use an epoxy-resin composition with an added block copolymer.

PRIOR ART PUBLICATION

Patent Publication patent publication 1: JP H11-5887A
patent publication 2: WO2004/048435
patent publication 3: JP H08-337707A
patent publication 4: JP H09-194611A
patent publication 5: WO2008/001705
patent publication 6: JP2003-535181A

SUMMARY OF THE INVENTION

Problems to be Solved by the Invention

However, the curing time for the prepreg disclosed in patent publication 1 is not short enough, and the cured product does not exhibit sufficient fracture toughness.

The prepreg disclosed in patent publication 2 can be sufficiently cured at a low temperature, but further improvement in fracture toughness is sought for a cured product of the prepreg.

In addition, regarding the technologies described in patent publications 3, 4, 5 and 6, since the time for curing the matrix resin is long and a high curing temperature is necessary, they do not satisfy the aforementioned requirements.

The present invention has been carried out in consideration of the above problems. Its objective is to provide an epoxy-resin composition that completely cures at a low temperature in a short period of time, exhibits excellent processability at room temperature when used in a prepreg, and suppresses voids in a molded product. Another objective is to provide a fiber-reinforced plastic having excellent mechanical characteristics, especially excellent fracture toughness and heat tolerance.

Solutions to the Problems

The inventors of the present invention have studied intensively and found an epoxy-resin composition with the following properties can produce a molded product at a lower temperature in a shorter period time than conventional epoxy-resin compositions. In addition, the inventors have found that by using an epoxy-resin composition related to the present invention, fiber-reinforced plastics are obtained to exhibit excellent mechanical characteristics, especially excellent fracture toughness and heat tolerance.

Namely, the present invention is as follows:

[1] An epoxy-resin composition containing components (A), (B), (C) and (D) below;
  component (A): an epoxy resin having a monomer unit represented by formula (1) below in the molecule
  component (B): a bifunctional epoxy resin with a number-average molecular weight of at least 600 but no more than 1300, which does not have a monomer unit represented by formula (1) below in the molecule
  component (C): a triblock copolymer
  component (D): a curing agent

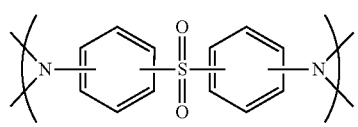

(1)

[2] The epoxy-resin composition described in [1] above, where component (B) is a bisphenol-type bifunctional epoxy resin;
[3] The epoxy-resin composition described in [1] or [2] above, where the content of component (A) in the epoxy-resin composition is 3~55 mass % of the total mass of the epoxy resin in the epoxy-resin composition;
[4] The epoxy-resin composition described in any of [1]~[3] above, where component (C) is a triblock copolymer of poly(methyl methacrylate)/poly(butyl acrylate)/poly(methyl methacrylate);
[5] The epoxy-resin composition described in any of [1]~[4] above, where component (C) is a triblock copolymer copolymerized with dimethylacrylamide;
[6] The epoxy-resin composition described in [5] above, where the polymerization proportion of the dimethylacrylamide in the triblock copolymer copolymerized with dimethylacrylamide is 10~15 mass % in terms of the polymerization material with respect to the total mass of the triblock copolymer copolymerized with dimethylacrylamide;
[7] The epoxy-resin composition described in any of [1]~[6] above, where component (D) is dicyandiamide;
[8] The epoxy-resin composition described in any of [1]~[7] above, further containing component (E) below;
  component (E): a urea-based curing aid
[9] The epoxy-resin composition described in any of [1]~[8] above, further containing component (F) below;
  component (F): an epoxy resin in a liquid state at 30° C.
[10] The epoxy-resin composition described in [9] above, where component (F) does not have a monomer unit represented by formula (1) above in the molecule and its viscosity at 30° C. is 1000 Pa·s or lower;
[11] The epoxy-resin composition described in [10] above, where component (F) is a bisphenol A bifunctional epoxy resin;
[12] The epoxy-resin composition described in any of [8]~[11] above, where component (E) is 3-phenyl-1,1-dimethylurea or toluene bis dimethyl urea;
[13] The epoxy-resin composition described in any of [1]~[12] above, where with respect to the total mass of epoxy resin in the epoxy-resin composition,
  the content of component (A) is 3~55 mass %,
  the content of component (B) is 45~97 mass %,
  the total content of components (A) and (B) does not exceed 100 mass %,
  the content of component (C) is 4~11 parts by mass based on 100 parts by mass of the epoxy resin in the epoxy-resin composition, and
  component (D) is dicyandiamide and the content of dicyandiamide is 1~25 parts by mass based on 100 parts by mass of epoxy resin in the epoxy-resin composition;
[14] The epoxy-resin composition described in any of [9]~[12] above, where with respect to the total mass of epoxy resin in the epoxy-resin composition,
  the content of component (A) is 3~55 mass %,
  the content of component (B) is 8~55 mass %,
  the content of component (F) is 20~60 mass %,
  the total content of components (A), (B) and (F) does not exceed 100 mass %,
  the content of component (C) is 4~11 parts by mass based on 100 parts by mass of the epoxy resin in the epoxy-resin composition, and
  component (D) is dicyandiamide and the content of dicyandiamide is 1~25 parts by mass based on 100 parts by mass of epoxy resin in the epoxy-resin composition;
[15] The epoxy-resin composition described in [13] or [14] above, where component (D) is dicyandiamide, and the content of component (D) in the epoxy-resin composition is set so that the molar number of active hydrogen in the dicyandiamide is 0.6~1.0 times the total molar number of epoxy groups of the epoxy resin in the epoxy-resin composition;
[16] The epoxy-resin composition described in [1]~[15] above, where component (A) is an epoxy resin obtained when epoxy resin (X), which has an average 1.8~2.5 epoxy groups per one molecule and has an epoxy equivalent of 500 or less, is reacted with amine compound (Y), which has at least one monomer unit represented by formula (1) above in the molecule;
[17] A film made of the epoxy-resin composition described in any of [1]~[16] above;
[18] A prepreg produced by impregnating reinforcing fiber material with the epoxy-resin composition described in any of [1]~[16] above; and
[19] A fiber-reinforced plastic made of reinforcing fiber and a cured product of the epoxy-resin composition described in any of [1]~[16] above.

Effects of the Invention

An epoxy-resin composition that cures at a low temperature in a short period of time is provided according to the present invention. In addition, a fiber-reinforced plastic having excellent mechanical characteristics, especially excellent fracture toughness and heat tolerance, is made from the epoxy-resin composition. Namely, according to the present invention, an excellent epoxy-resin composition, a film and a prepreg made by using the epoxy-resin composition are provided, along with a fiber-reinforced plastic produced by using the prepreg.

DETAILED DESCRIPTION OF THE EMBODIMENTS

Embodiments to carry out the present invention are described in the following.

The term epoxy resin is referred to as a general category for a thermosetting resin, or as a chemical category for a compound having one or multiple 1,2-epoxy groups in the molecule. In the embodiments of the present invention, the latter definition is employed.

In the embodiments of the present invention, the "molecular weight" indicates a number-average molecular weight unless otherwise specified.

In the present application, "~" includes the number, ratio or the like provided before and after "~".

<Epoxy-Resin Composition>

In the embodiments of the present invention, an epoxy-resin composition contains components (A), (B), (C) and (D). Each component is described in the following.

(Component (A): Epoxy Resin having a Monomer Unit Represented by Formula (1) in the Molecule)

As component (A), the epoxy-resin composition according to an embodiment of the present invention contains an epoxy resin having a monomer unit represented by formula (1) below in the molecule. Because it contains the epoxy resin having a monomer unit represented by formula (1), the epoxy-resin composition of the embodiment cures at a low temperature in a short period of time.

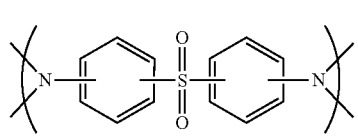

(1)

In the embodiments of the present invention, "low temperature" indicates temperatures at 100~130° C., and "short period of time" indicates 5~60 minutes.

Component (A) is obtained as a mixture that contains multiple kinds of epoxy resins corresponding to component (A) by reacting epoxy resin (X) and amine compound (Y), which includes at least one monomer unit represented by formula (1) above in the molecule (hereinafter, the reactions may also be referred to as "preliminary reactions"). It is not necessary to separate component (A) from the mixture.

As for epoxy resin (X) to be used for preliminary reactions, it is not limited specifically as long as the effects of the present invention are achieved; however, it is preferred for an epoxy resin to have two epoxy groups in the molecule and to have an epoxy equivalent of 500 or less. The epoxy equivalent is more preferably 300 or less, because excessively high viscosity of the epoxy-resin composition containing the epoxy resin is prevented, resulting in excellent processability during production and processing of a prepreg that contains the epoxy-resin composition (which hereinafter may also be referred to as simply "processability"). In addition, the lower limit of the epoxy equivalent of epoxy resin (X) is not limited specifically as long as the effects of the present invention are achieved, but it is usually preferred to be 100 or greater. Namely, epoxy resin (X) is preferred to have an epoxy equivalent of 100~500, more preferably 100~300.

When epoxy resin (X) is set to have an epoxy equivalent of 500 or less, the viscosity of component (A) will not be too high, thereby suppressing an increase in the viscosity of the epoxy-resin composition containing component (A). Accordingly, setting an epoxy equivalent at such a range is preferable because of excellent processability of the epoxy-resin composition and its subsequent prepreg containing such an epoxy resin.

Examples of epoxy resin (X) used for preliminary reactions are preferred to be bisphenol-type epoxy resins, more preferably bisphenol A epoxy resins, from the viewpoints of processability and cost performance. In addition, to provide various properties, multiple epoxy resins may be mixed and used.

Examples of amine compound (Y) having at least one monomer unit represented by formula (1) in the molecule are preferred to be 4,4'-diaminodiphenylsulfone, 3,3'-diaminodiphenylsulfone and their derivatives. Regarding amine compound (Y) having at least one monomer unit represented by formula (1) in the molecule, the amount to be added is preferred to be 5~10 parts by mass based on 100 parts by mass of epoxy resin (X) used for preliminary reactions. The amount of added amine compound (Y) is preferred to be at least 5 parts by mass, because the epoxy-resin composition containing the obtained component (A) cures in a short period of time, while heat tolerance is enhanced in a cured product of the epoxy-resin composition. In addition, the amount of added amine compound (Y) is preferred to be 10 parts by mass or less, because excellent processability is achieved.

Also, the reaction temperature for preliminary reactions is usually 120~180° C., and reaction time is preferred to be approximately 1~20 hours depending on the molecular weight desired for component (A).

In the embodiments of the present invention, component (A) is preferred to be an epoxy resin obtained when epoxy resin (X), which has two epoxy groups per one molecule and whose epoxy equivalent is 500 or less, is reacted with amine compound (Y), which has at least one monomer unit represented by formula (1) above in the molecule. More preferably, component (A) is an epoxy resin obtained when epoxy resin (X), which has two epoxy groups per one molecule and whose epoxy equivalent is 500 or less, is reacted with at least one amine compound (Y) selected from a group of 4,4'-diaminodiphenylsulfone, 3,3'-diaminodiphenylsulfone and their derivatives.

In the embodiments of the present invention, "heat tolerance of a cured product of the epoxy-resin composition" is evaluated by the glass transition temperature (G'-Tg) of a cured product obtained by curing the epoxy-resin composition of the embodiment.

In an embodiment of the present invention, the content of component (A) in the epoxy-resin composition is preferred to be 3~55 parts by mass based on the total 100 parts by mass of all the epoxy resins in the epoxy-resin composition of the embodiment. The content of component (A) is preferred to be at least 3 parts by mass, because the epoxy-resin composition is cured in a short period of time and a cured product exhibits high heat tolerance. On the other hand, the content is preferred to be no more than 55 parts by mass from the viewpoint of fracture toughness of the cured product. It is more preferred to be 4~45 parts by mass and especially preferred to be 10~45 parts by mass. Namely, the content of component (A) in the epoxy-resin composition is preferred to be 3~55 mass %, more preferred to be 4~45 mass % and especially preferred to be 10~45 mass %, based on the total mass of epoxy resins in the epoxy-resin composition.

In the embodiments of the present invention, "fracture toughness of a cured product of the epoxy-resin composition" indicates a value of fracture toughness "$G_{Ic}$" (critical energy release rate) obtained by employing an SENB method described in ASTM D5045.

(Component (B): Bifunctional Epoxy Resin, whose Number-average Molecular Weight is at least 600 but no greater than 1300, and which does not contain a monomer unit Represented by Formula (1) in the Molecule).

In the embodiments of the present invention, a "bifunctional epoxy resin" indicates a compound having two epoxy groups in the molecule. The same applies to a "trifunctional epoxy resin" or the like.

The epoxy-resin composition according to an embodiment of the present invention is preferable since its fracture toughness is improved because of component (B) contained therein.

As for component (B), a bisphenol-type bifunctional epoxy resin or a bifunctional epoxy resin having an oxazolidone-ring structure is preferred. Specific examples are bisphenol A bifunctional epoxy resins, bisphenol F bifunctional epoxy resins, bifunctional epoxy resins with an oxazolidone-ring structure, and the like. Among those, bisphenol A bifunctional epoxy resins are preferred because high mechanical strength is obtained, and bifunctional epoxy resins with an oxazolidone-ring structure are preferred because high heat tolerance is obtained. Alternatively, component (B) may also be a bisphenol A bifunctional epoxy resin with an oxazolidone-ring structure.

Yet alternatively, two or more of those epoxy resins listed above may be combined for use as component (B).

In an embodiment of the present invention, the number-average molecular weight of component (B) of the epoxy-resin composition is at least 600 but no greater than 1300. The number-average molecular weight of component (B) is preferred to be at least 600 because a cured product of the epoxy-resin composition containing such component (B) exhibits high fracture toughness. In addition, the number-average molecular weight of component (B) is more preferably at least 900. On the other hand, for the epoxy-resin composition to exhibit high heat tolerance, the number-average molecular weight of component (B) is preferred to be no greater than 1300, more preferably no greater than 1000. Namely, the number-average molecular weight of component (B) is preferred to be at least 600 but no greater than 1300, more preferably at least 900 but no greater than 1000.

In the present application, "normal temperature" indicates a temperature range of 10~30° C.

Examples of a commercially available bisphenol bifunctional epoxy resin preferred to be used as component (B) in an embodiment of the present invention are bisphenol A epoxy resins jER 1001, jER 1002 (brand names, made by Mitsubishi Chemical Corporation), and the like. Examples of an epoxy resin with an oxazolidone-ring structure are AER4152 and AER4151 (brand names, made by Asahi Kasei E-Materials Corporation), ACR1348 (brand name, made by ADEKA Corporation), DER852 (brand name, made by Dow Chemical Company), and the like.

Component (B) contained in an epoxy-resin composition related to the present invention is required to be a bifunctional epoxy resin. When a bifunctional epoxy resin is used, a cured product of the epoxy-resin composition containing such an epoxy resin exhibits higher fracture toughness than when a trifunctional epoxy resin or higher is used, for example, and the cured product exhibits higher heat tolerance than when a monofunctional epoxy resin is used.

The content of component (B) in an epoxy-resin composition is preferred to be 8~97 parts by mass based on total 100 parts by mass of all the epoxy resins in the epoxy-resin composition. Namely, the content of component (B) in an epoxy-resin composition is preferred to be 8~97 mass % of the total mass of the epoxy resins in the epoxy-resin composition.

Especially, when an epoxy-resin composition contains only components (A) and (B) as its epoxy resins, the content of component (B) is set so that the content of component (A) will be within the above range. For example, when the content of component (A) is 3~55 parts by mass based on total 100 parts by mass of all the epoxy resins in the epoxy-resin composition, the content of component (B) is preferred to be 45~97 parts by mass. Namely, when the epoxy-resin component in an epoxy-resin composition is made up only of components (A) and (B), the proportions of components (A) and (B) are preferred to be 3~55 mass % for component (A) and 45~97 mass % for component (B), based on the total mass of components (A) and (B) in the epoxy-resin composition.

When the epoxy-resin composition further contains another epoxy resin such as later-described component (F), the content of component (B) in the epoxy-resin composition is preferred to be at least 8 parts by mass but no more than 55 parts by mass based on the total mass of the epoxy resins. Setting the content of component (B) to be at least 8 parts by mass is preferred since a cured product of the epoxy-resin composition exhibits even higher fracture toughness. On the other hand, setting the content to be no more than 55 parts by mass is preferred since it is easier to produce a molded product that exhibits even higher heat tolerance. The content of component (B) is especially preferred to be 20~50 parts by mass based on the total mass of the epoxy resins in an epoxy-resin composition. Namely, when an epoxy-resin composition further contains component (F), the content of component (B) in the epoxy-resin composition is preferred to be 8~55 mass %, more preferably 20~50 mass %, of the total mass of the epoxy resins in the epoxy-resin composition.

(Component (C): Triblock Copolymer)

The triblock copolymer used as component (C) in an embodiment of the present invention indicates a triblock copolymer having a structure where a polymer designated to be a hard segment is connected to both ends of a polymer designated to be a soft segment. The "soft segment" has a high Tg relative to that of the "hard segment." Also, the phrase "both ends of a polymer" indicates the end portions of the longest straight chain among the molecular chains of the polymer.

Examples of the above triblock copolymer are
a triblock copolymer of poly(methyl methacrylate)/poly(butyl acrylate)/poly(methyl methacrylate);
a triblock copolymer of poly(styrene)/poly(butadiene)/poly(methyl methacrylate); and the like. Namely, examples are a triblock copolymer where poly(methyl methacrylate), poly(butyl acrylate) and poly(methyl methacrylate) are copolymerized in that order, and a triblock copolymer where poly(styrene), poly(butadiene), and poly(methyl methacrylate) are copolymerized in that order.

A triblock copolymer is microdispersed in an epoxy resin when a polymer that is incompatible with epoxy resins is selected for the central soft segment and a polymer that is compatible with epoxy resins is selected for either or both of the hard segments. The polymer for a soft segment has a lower glass-transition temperature and higher fracture toughness than the polymer for a hard segment. Thus, by microdispersing a triblock copolymer with such a structure in the epoxy resin, heat tolerance of a cured product of the epoxy-resin composition is suppressed from lowering and its fracture toughness is improved.

At both of its ends, a triblock copolymer of poly(methyl methacrylate)/poly(butyl acrylate)/poly(methyl methacrylate) has a hard segment made of a polymer compatible with epoxy resins, and it disperses well in epoxy resins. Thus, such a triblock copolymer is preferred since the fracture toughness of a cured product of the epoxy-resin composition is significantly improved. Examples of a commercially available triblock copolymer of poly(methyl methacrylate)/poly(butyl acrylate)/poly(methyl methacrylate) are Nanostrength® M52N, M22 and M22N (brand names, made by ARKEMA, Inc.)

In addition, as component (D), a triblock copolymer may further contain dimethylacrylamide for a monomer as a material to form the soft segment and/or the hard segment. A triblock copolymer copolymerized with dimethylacrylamide is preferred since such a triblock copolymer contributes to expressing excellent fracture toughness in cured products of the epoxy-resin composition. Among commercially available triblock copolymers of poly(methyl methacrylate)/poly(butyl acrylate)/poly(methyl methacrylate), examples of a triblock copolymer further containing dimethylacrylamide are Nanostrength® M52N and M22N (brand names, made by ARKEMA).

In component (C), it is preferable for the copolymerization proportion of dimethylacrylamide to be 10~15 mass % in terms of the monomer material of component (C), since the fracture toughness of a cured product of the epoxy-resin composition is especially excellent.

Namely, when component (D) is a triblock copolymer further copolymerized with dimethylacrylamide, the proportion of dimethylacrylamide in the triblock copolymer copolymerized with dimethylacrylamide is preferred to be 10~15 mass % in terms of polymerization material based on the total mass of the triblock copolymer copolymerized with dimethyl acrylamide.

Among commercially available triblock copolymers of poly(methyl methacrylate)/poly(butyl acrylate)/poly(methyl methacrylate), an example of such a triblock copolymer mentioned above is Nanostrength® M52N (brand name, made by ARKEMA) or the like.

In addition, examples of commercially available triblock copolymers of poly(styrene)/poly(butadiene)/poly(methyl methacrylate) are Nanostrength® 123, 250, 012, E40 (brand names, made by ARKEMA) and the like.

The content of component (C) in the epoxy-resin composition of the present invention is preferred to be at least 4 parts by mass based on total 100 parts by mass of all the epoxy resins in the epoxy-resin composition, because a cured product of the epoxy-resin composition exhibits high fracture toughness. The content is preferred to be no more than 11 parts by mass, since the cured product of the epoxy-resin composition exhibits higher flexural strength. It is especially preferred for the content to be 5~9 parts by mass.

(Component (D): Curing Agent)

Component (D) in the epoxy-resin composition of an embodiment of the present invention is used as a curing agent. The curing agent used as component (D) is not limited specifically as long as the effects of the present invention are achieved. For example, dicyandiamide, amine-based curing agents, imidazoles, acid anhydrides, boron chloride amine complexes and the like may be used.

Among those, examples of amine-based curing agents are dicyandiamide, diaminodiphenylsulfone and the like.

Examples of imidazoles are 2-phenyl-4,5-dihydroxymethylimidazole, 2-phenyl-4-methyl-5-hydroxymethylimidazole and the like.

Examples of acid anhydrides are hydrogenated methylnadic acid anhydride, methylhexahydrophthalic anhydride, and the like.

Especially, using dicyandiamide is preferred because properties of the epoxy-resin composition will not be affected by humidity in the air, the quality of the epoxy-resin composition is kept stable for a long period of time, and the epoxy-resin composition completely cures at a relatively low temperature. Here, a "relatively low temperature" indicates temperatures in a range of 100~130° C.

The content of component (D) depends on the type of component (D). For example, when component (E) is dicyandiamide, its content is usually 1~25 parts by mass based on 100 parts by mass of epoxy resins in the epoxy resin composition. More preferably, the molar number of active hydrogen of the dicyandiamide is preferred to be 0.6~1.0 times the total molar number of epoxy groups in the epoxy resins contained in the epoxy-resin composition. A setting of 0.6 times or greater is preferred because a cured product exhibits excellent heat tolerance and mechanical characteristics (namely, high strength). In addition, if it is 1.0 time or less, a cured product having excellent mechanical characteristics is obtained. It is further preferable for the molar number of active hydrogen of dicyandiamide to be 0.6~0.8 times the total molar number of epoxy groups in the epoxy resins contained in the epoxy-resin composition, since heat tolerance is even higher in a cured product of the epoxy-resin composition.

The total molar number of epoxy groups in epoxy resins contained in an epoxy-resin composition is calculated from the amounts that were fed into the composition.

(Component (E): Urea-based Curing Aid)

The epoxy-resin composition of an embodiment of the present invention may contain component (E)—a urea-based curing aid—if necessary. Especially, when dicyandiamide is used as component (D), using both the dicyandiamide and a urea-based curing aid is preferred since the epoxy-resin composition containing them completely cures at a low temperature in a short period of time.

Examples of a urea-based curing aid are urea derivative compounds such as 3-phenyl-1,1-dimethylurea (PDMU), toluene bis dimethyl urea (TBDMU), 3-(3,4-dichlorophenyl)-1,1-dimethylurea (DCMU) and the like. Urea-based curing aids are not limited to those and may be used alone or in combination of two or more.

Among those, 3-phenyl-1,1-dimethylurea and toluene bis dimethyl urea are especially preferred, since a cured product of the epoxy-resin composition exhibits higher heat tolerance and flexural strength, and the curing time of the epoxy-resin composition is shortened.

In addition, using 3-phenyl-1,1-dimethylurea or 3-(3,4-dichlorophenyl)-1,1-dimethylurea as component (E) is preferred, since a cured product of the epoxy-resin composition containing such component (E) exhibits especially high toughness.

The content of component (E) is preferred to be 1.0~5.0 parts by mass based on total 100 parts by mass of all the epoxy resins in the epoxy-resin composition because an excellent cured product is obtained. Moreover, it is even more preferable for the content to be 1.5~4.0 parts by mass, since an acute elevation of viscosity will not occur when the epoxy-resin composition containing such component (E) is heated to a curing temperature in a molding process, and voids are suppressed in the molded product. In addition, the molded product exhibits high heat tolerance.

(Component (F): Epoxy Resin in a Liquid State at 30° C.)

The epoxy-resin composition according to an embodiment of the present invention is preferred to further contain component (F) for viscosity adjustment of the composition. Component (F) is an epoxy resin in a liquid state at 30° C., and is preferred not to have a monomer unit represented by formula (1) in the molecule and to have a viscosity of 1000 Pa-s or lower at 30° C. The molecular weight of component (F) depends on the structure of component (F). When it is a bisphenol bifunctional epoxy resin, the molecular weight is preferred to be less than 600, more preferably 500 or lower. Also, the lower limit of the molecular weight of component (F) depends on the structure of component (F), and the molecular weight is preferred to be at least 200 if it is a bisphenol bifunctional epoxy resin.

The viscosity of component (F) at 30° C. is measured by applying heat on component (F) at a frequency of 1 Hz and a programmed rate of temperature rise of 2° C./min using a rheometer (rotary dynamic viscoelasticity measuring device) such as DSR-200 (made by Rheometrics, Inc.)

In addition, even when the viscosity of component (F) is outside the range set in the present application, if a corrected value at 30° C. is within the range, such a value is also included in the present application.

Examples of the aforementioned epoxy resin are bisphenol A epoxy resins, bisphenol F epoxy resins, biphenyl epoxy resins, dicyclopentadiene epoxy resins, phenol novolac epoxy resins, cresol novolac epoxy resins, tetraglycidyl diamine epoxy resins, glycidyl phenyl ether epoxy resins, and the like. In addition, epoxy resins obtained by modifying those epoxy resins with rubber, urethane or the like, brominated epoxy resins obtained by brominating those epoxy resins, and so on are also included. However, those are not the only options, and two or more epoxy resins may be combined.

Commercially available epoxy resins of the above listed epoxy resins are bisphenol A epoxy resins jER828 and jER834 (brand names, made by Japan Epoxy Resins, Ltd.), bisphenol F epoxy resin jER807 (brand name, made by Japan Epoxy Resins), and the like, for example.

Component (F) is more preferred to be a bisphenol bifunctional epoxy resin because a cured product of the epoxy-resin composition exhibits high heat tolerance, and because when heat is applied to a curing temperature in a molding process, an acute elevation of viscosity will not occur in the epoxy resin composition and voids are thereby prevented in a molded product.

The content of component (F) is set in such a way that the contents of components (A) and (B) are within the aforementioned respective ranges, but the content is preferred to be at least 20 parts by mass but no more than 60 parts by mass based on total 100 parts by mass of all the epoxy resins in the epoxy-resin composition.

When the content of component (F) is at least 20 parts by mass, a molded product having fewer voids is obtained by using the epoxy-resin composition containing component (F). On the other hand, the content is preferred to be no more than 60 parts by mass from the viewpoints of processability of a prepreg containing the epoxy-resin composition and fracture toughness of a cured product of the epoxy-resin composition. The content is especially preferred to be 45~50 parts by mass. Namely, the content of component (F) is preferred to be 20~60 mass %, more preferably 45~50 mass %, of the total mass of all the epoxy resins in the epoxy-resin composition.

(Other Epoxy Resin (Z))

The epoxy-resin composition according to an embodiment of the present invention is preferred to be made of components (A) and (B) only, or components (A), (B) and (F) only. However, the epoxy-resin composition may further contain epoxy resin (Z), which is not any of components (A), (B) and (F), if it is within a range that does not deviate from the scope of the present invention.

Examples of such epoxy resin (Z) are bifunctional epoxy resins such as bisphenol A epoxy resins, bisphenol F epoxy resins, biphenyl epoxy resins, dicyclopentadiene epoxy resins, and modified epoxy resins of those epoxy resins. Examples of polyfunctional epoxy resins having three or more functional groups are phenol novolac epoxy resins, cresol novolac epoxy resins, glycidylamine epoxy resins such as tetraglycidyl diaminodiphenyl methane, glycidyl phenyl ether epoxy resins such as tetrakis(glycidyloxyphenyl)ethane, and tris(glycidyloxyphenyl)methane, and glycidylamine and glycidylphenyl ether epoxy resins such as triglycidylaminophenol. In addition, examples include modified epoxy resins of those resins, brominated epoxy resins of the above resins, and the like. However, epoxy resin (Z) is not limited to the above, and two or more of the epoxy resins above may be combined.

(Other Additives)

As an optional component, the epoxy-resin composition according to an embodiment of the present invention may contain one or more additives (hereinafter referred to as "optional additives") selected from among a group of thermoplastic resins other than component (B), elastomers, and thermoplastic elastomers. Such an optional additive works to optimize viscosity, storage elasticity and thixotropic properties of the epoxy-resin composition by modifying the composition's visco-elasticity, and also works to improve the fracture toughness of a cured product of the epoxy-resin composition. Thermoplastic resins, elastomers and thermoplastic elastomers to be used as an optional additive may be used alone or in combination of two or more.

Such an additive as those listed above may be dissolved in epoxy-resin components, or may be contained in the epoxy-resin composition in a state of fine particles, long fiber, short fiber, fabric, nonwoven cloth, mesh, pulp or the like. The optional additive is preferred to be provided on the surface layer of a prepreg in a state of fine particles, long fiber, short fiber, fabric, nonwoven cloth, mesh, pulp or the like, since interlayer delamination is suppressed from occurring in later-described fiber-reinforced plastics produced by laminating the prepreg.

As for thermoplastic resins, it is preferred to use a thermoplastic resin that contains in its main chain at least one type of bonding selected from a group of carbon-carbon bonding, amide bonding, imide bonding, ester bonding, ether bonding, carbonate bonding, urethane bonding, urea bonding, thioether bonding, sulfonic bonding, imidazole bonding and carbonyl bonding. More specific examples are thermoplastic resins that belong to engineering plastics such as polyacrylate, polyamide, polyaramid, polyester, polycarbonate, polyphenylene sulfide, polybenzimidazole, polyimide, polyether imide, polysulfone, and polyether sulfone.

Among those, polyimide, polyetherimide, polysulfone, polyethersulfone and the like are especially preferred because excellent heat tolerance is achieved. Also, those thermoplastic resins are preferred to have functional groups that are reactive with epoxy resins from the viewpoints of enhanced fracture toughness and storage stability in a cured product of the resin composition related to the present invention. Examples of functional groups having favorable reactivity with epoxy resins are carboxyl groups, amino groups and hydroxyl groups.

<Method for Producing Epoxy-Resin Composition>

A method for producing an epoxy-resin composition related to the present invention is not limited specifically, as long as the effects of the present invention are achieved. Any known method may be employed. For example, it is an option to mix simultaneously all the components to form an epoxy-resin composition. Alternatively, it is another option to prepare a masterbatch by mixing part of an epoxy resin to be contained in a composition with component (E) (curing agent) and the like, and to produce an epoxy-resin composition using the masterbatch. Mixers such as a three-roll mill, planetary mixer, kneader, universal mixer, homogenizer, homodispenser, and the like are used in the mixing process.

In an embodiment of the present invention, an epoxy-resin composition may be prepared as follows.

Step (1): prepare a catalytic resin composition by dispersing components (D) and (E) homogeneously into a portion of epoxy resin;

Step (2): prepare a dissolved thermoplastic resin base by feeding epoxy resin (all of components (A) and (B), or all of components (A), (B), (F), and (Z) when components (F) and (Z) are included), additives and the like into a dissolution vessel and by heating and mixing at 140~170° C. for 1~6 hours; and Step (3): produce an epoxy-resin composition by cooling the masterbatch prepared in step (2) to 50~70° C., adding the catalytic resin composition prepared in step (1), and mixing them at 50~70° C. for 0.5~2 hours.

Step (3') below may be added between steps (2) and (3). In such a case, part of the epoxy resin is fed in step (2) and the rest is fed in step (3).

Step (3'): prepare a masterbatch by feeding the dissolved thermoplastic resin base and the rest of components (A), (B), (F) and (Z) into a dissolution vessel and by heating and mixing at 70~140° C. for 1~3 hours.

<Film Made of Epoxy-Resin Composition>

By coating the epoxy-resin composition of an embodiment of the present invention on a release paper and the like and by curing the coating, a film is obtained. The film related to the present invention is useful as an intermediate material for producing a prepreg, or as surface-protective film or adhesive film when laminated on a base material and cured thereon.

An aspect of the present invention is to produce a film from the epoxy-resin composition.

As for application examples, it is preferred to coat the epoxy-resin composition of the present invention on a surface of a base material such as a release paper. The uncured coated layer may be laminated on another base material and cured thereon, or the coated layer itself is cured, so that a film is formed.

<Prepreg and Fiber-Reinforced Plastic>

A prepreg is obtained by impregnating a reinforcing fiber material with the epoxy-resin composition of an embodiment of the present invention.

The reinforcing fiber material to be used for a prepreg related to the present invention may be in a state of tow, cloth or chopped fiber, continuous fibers aligned to have a unidirectional orientation, continuous fibers woven to have vertical and horizontal orientations, tows in a unidirectional alignment and held by a horizontal auxiliary yarn, multiple unidirectional reinforcing fiber sheets laminated in different directions and stitched with an auxiliary yarn so as to form multiaxial warp knit, unwoven reinforcing fibers, and the like.

Among those, preferred states are continuous fibers aligned to have a unidirectional orientation, continuous fibers woven to have vertical and horizontal orientations, tows in a unidirectional alignment and held by a horizontal auxiliary yarn, and multiple unidirectional reinforcing fiber sheets laminated in different directions and stitched with an auxiliary yarn so as to form multiaxial warp knit.

To exhibit strength in a cured product, a state of continuous fibers aligned to have unidirectional orientation is more preferred.

Reinforcing fibers of the reinforcing fiber material are not limited specifically; for example, carbon fibers, graphite fibers, glass fibers, organic fibers, boron fibers, steel fibers and the like may be used. Especially, carbon fibers and graphite fibers are preferred to be used in a prepreg since they have an excellent specific modulus and contribute significantly to produce lightweight molded products that contain such fibers. Also, numerous types of carbon fibers and graphite fibers are available for various uses.

A prepreg related to the present invention is obtained using a known method by impregnating a reinforcing fiber material with the aforementioned epoxy-resin composition of an embodiment of the present invention. For example, a prepreg is produced by the following methods: a predetermined amount of the epoxy-resin composition is coated on a surface of a release paper or the like and a reinforcing fiber material is provided onto the surface, and they are then set to pass through a pressurizing roll so that the epoxy-resin composition is impregnated into the reinforcing fiber material; or a predetermined amount of the epoxy-resin composition is directly coated on a reinforcing fiber material, and the coated reinforcing fiber material is sandwiched by release paper or the like, if necessary, and is passed through a pressurizing roll so that the epoxy-resin composition is impregnated into the reinforcing fiber material.

Namely, another aspect of the present invention is a prepreg formed by using an epoxy-resin composition related to the present invention. The prepreg is preferred to contain the epoxy-resin composition and a reinforcing fiber material.

Fiber-reinforced plastics related to the present invention are made of reinforcing fiber and a cured product of the epoxy-resin composition according to an embodiment of the present invention described above. Use of fiber-reinforced plastics is not limited specifically; for example, they are used in industrial applications such as aircraft structural material, automobiles, ships, sports equipment, windmills, rolls and the like.

Methods for producing fiber-reinforced plastics related to the present invention are not limited specifically. For example, using the aforementioned prepreg, plastics are molded by autoclave molding, sheet wrapping, pressing or the like. Alternatively, plastics are molded when the epoxy-resin composition is impregnated into filaments or preform of reinforcing fibers and then is cured by using molding methods such as RTM (resin transfer molding), VaRTM (vacuum assisted resin transfer molding), filament winding, RFI (resin film infusion) or the like.

When fiber-reinforced plastics are produced through compression molding of the prepreg related to the present invention, the method is preferred to include steps for heating and compressing the prepreg or a preform made by laminating the prepreg by sandwiching it in a die preheated at a curing temperature. The temperature of the die is preferred to be 120~140° C., and curing time is preferred to be 5~60 minutes.

EXAMPLES

The present invention is described by the examples below. However, the present invention is not limited to such examples.
<Raw Material>
(Component (A))
  component (A-1): epoxy resin with an epoxy equivalent of 266 g/eq. synthesized as follows.
  To obtain component (A-1), 100 parts by mass of bisphenol A epoxy resin with a number-average molecular weight of 370 (brand name: jER828, made by Mitsubishi Chemical Corporation) and 9 parts by mass of 4,4'-diaminodiphenylsulfone (brand name: Seikacure-S, made by Seika Corporation) were mixed, the mixture was heated to 170° C. and then reacted for an hour (preliminary reactions).
(Component (B))
  component (B-1): bisphenol A bifunctional epoxy resin (number-average molecular weight of 900, brand name: jER1001, made by Mitsubishi Chemical)
  component (B-2): bisphenol A bifunctional epoxy resin (number-average molecular weight of 1200, brand name: jER1002, made by Mitsubishi Chemical)
  component (B-3): bifunctional epoxy resin with an oxazolidone-ring structure (number-average molecular weight of 814, brand name: AER4152, made by Asahi Kasei E-Materials Corporation)
(Component (C))
  component (C-1): an acrylic block copolymer of poly(methyl methacrylate)/poly(butyl acrylate)/poly(methyl methacrylate), which is further copolymerized with dimethylacrylamide (brand name: Nanostrength® M52N, made by ARKEMA, Inc.)
  component (C-2): an acrylic block copolymer of poly(methyl methacrylate)/poly(butyl acrylate)/poly(methyl methacrylate), which is further copolymerized with dimethylacrylamide (brand name: Nanostrength® M22N, made by ARKEMA)
(Component (D))
  component (D-1): dicyandiamide (brandname: DICY15, made by Mitsubishi Chemical)
(Component (E))
  component (E-1): 3-phenyl-1,1-dimethylurea (brand name: Omicure 94, made by Hodogaya Chemical Co., Ltd.)
  component (E-2): 3-(3,4-dichlorophenyl)-1,1-dimethylurea (brand name: DCMU99, made by PTI Japan Corporation)
  component (E-3): toluene his dimethyl urea (brand name: Omicure 24, made by Hodogaya Chemical Co., Ltd.)
(Component (F))
  component (F-1): bisphenol A bifunctional epoxy resin (number-average molecular weight of 370, brand name: jER828, made by Mitsubishi Chemical)
(Other Epoxy Resin (Z))
  (Z-1): phenol novolac polyfunctional epoxy resin (number-average molecular weight of 1100, brand name: N775, made by DIC Corporation)
(Other Component (K))
  (K-1): a block copolymer that is not a triblock copolymer; poly(ether ester amide) (brand name: TPAE32, made by T&K TOKA Corporation)
  (K-2): 4,4-diaminodiphenylsulfone (Seikacure-S, made by Seika Corp.)
  (K-3): epoxy resin; product of preliminary reactions of jER828 and DICY15)
  To obtain the epoxy resin, 100 parts by mass of bisphenol A epoxy resin with a number-average molecular weight of 370 (brand name: jER828, made by Mitsubishi Chemical) and 9 parts by mass of dicyandiamide (brand name: DICY15, made by Mitsubishi Chemical) were mixed, the mixture was heated to 150° C. and then reacted for an hour.
<Steps for Preparing Catalytic Resin Composition for Use in Examples and Comparative Examples>

From the components of epoxy-resin compositions in each example and comparative example shown in tables 1~6, a portion of component (F-1) (brand name: jER828) was set aside, and component (D) (DICY15) and component (E) were uniformly dispersed into the portion using a three-roll mill to prepare a catalytic resin composition.
<Steps for Preparing Epoxy-Resin Composition>

The rest of the components shown in tables 1~6, excluding the components used for preparing the catalytic resin composition and component (A-1), were fed into a glass flask, heated and mixed at 150° C. to obtain homogeneously mixed masterbatch 1. Next, into the masterbatch 1 that was cooled to 90° C. or lower, component (A-1) was added, heated and mixed at 90° C. to be uniformly dispersed in masterbatch 1. As a result, masterbatch 2 was prepared. Then, into the masterbatch 2 that was cooled to 60° C. or lower, the catalytic resin composition was added, heated and mixed at 60° C. to be uniformly dispersed. Accordingly, an epoxy-resin composition was obtained. The components of each epoxy-resin composition are shown in tables 1~6.
<Steps for Producing Cured-Resin Sheet of Epoxy-Resin Composition>

The epoxy-resin composition prepared according to the steps for preparing an epoxy-resin composition above was sandwiched between glass plates using a 2 mm~3mm-thick spacer made of polytetrafluoroethylene. Then, the temperature was raised at a programmed rate of 4° C./min, and the composition was cured by maintaining the temperature at 120° C. for 45 minutes. Accordingly, a cured-resin sheet was obtained.
<Method for Measuring G'-Tg>

The 2 mm-thick cured-resin sheet obtained in the above step for preparing a cured-resin sheet of an epoxy-resin composition, or each fiber-reinforced plastic panel such as that obtained in later-described examples 16~21, was processed into a test piece (55 mm long×12.5 mm wide). Then, using a rheometer (brand name: ARES-RDA, made by TA Instruments), values of log G' were plotted in relation to temperature under conditions of frequency at 1 Hz and a programmed rate of temperature rise at 5° C./min. Glass transition temperature (G'-Tg) is obtained as the temperature at a point where an approximate straight line in the flat region of log G' intersects with an approximate straight line of the region where G' makes a transition.
<Method for Measuring $G_{Ic}$ of Cured-Resin Sheet>

Regarding a 3 mm-thick cured-resin sheet obtained in the above step for producing the cured-resin sheet of an epoxy-resin composition, the value of fracture toughness $G_{Ic}$ (critical energy release rate) was measured by employing an SENB method described in ASTM D5045.

Method for Measuring Flexural Properties of Fiber-Reinforced Plastic

Each fiber-reinforced plastic obtained in later-described examples 16~21 was processed into a test piece (130 mm long×12.7 mm wide) in such a way that reinforcing fibers have an orientation angle of 0 degree to a long side of the test piece. Then, flexural properties of the fiber-reinforced plastic were measured by using a universal testing instrument (brand name: Instron 4465, made by Instron Corporation). Using a three-point bending tool (load applicator R=5 mm, support R=3.2 mm) under conditions of a temperature at 23° C. and relative humidity at 50%, flexural strength, flexural modulus, and degree of flexural elongation under a maximum load were measured for each fiber-reinforced plastic. At that time, distance (L) between supports and thickness (d) of each test piece were set as follows: a ratio (L/d)=40, and a crosshead speed (rate per minute)=(L²×0.01)/(6×d). In addition, 0-degree flexural properties were converted to have a Vf of 60%.

Examples 1~15, 22~24, Comparative Examples 1~6

Following the above preparation steps and production steps, epoxy-resin compositions and cured-resin sheets were each produced to have their respective components as shown in tables 1~5. Then, G'-Tg and $G_{Ic}$ were measured for each example by the methods shown above. The results are shown in tables 1~5.

It was found that examples 1~15 were each fully cured under curing conditions of 45 minutes at a temperature of 120° C., and each showed a high $G_{Ic}$ value of at least 1000 J/m², and G'-Tg was 125° C. or higher.

As shown in table 1, comparative example 1 was found to require a longer curing time and to exhibit lower heat tolerance.

As shown in table 2, comparative example 2 was found to have lower fracture toughness.

As shown in table 3, comparative example 3 was found to have lower fracture toughness.

As shown in table 4, comparative example 4 was found to have lower fracture toughness, and comparative examples 5 and 6 were found to have lower heat tolerance.

TABLE 1

| | | number-average molecular weight | comp. example 1 | example 1 | example 2 | example 3 | example 4 | example 24 |
|---|---|---|---|---|---|---|---|---|
| component (A) | (A-1) | | 0 | 4 | 18 | 27 | 54 | 63 |
| component (B) | (B-1) | 900 | 45 | 45 | 45 | 45 | 13 | 13 |
| component (F) | (F-1) | 370 | 55 | 51 | 37 | 28 | 33 | 24 |
| component (C) | (C-1) | | 8.0 | 8.0 | 8.0 | 8.0 | 8.0 | 8.0 |
| component (D) | (D-1) | | 5.7 | 5.7 | 5.7 | 5.7 | 5.7 | 5.7 |
| component (E) | (E-1) | | 4.3 | 4.3 | 4.3 | 4.3 | 4.3 | 4.3 |
| $G_{Ic}$ (J/m²) | | | 2710 | 2780 | 2360 | 2060 | 1510 | 961 |
| G'-Tg (° C.) | | | 124 | 126 | 128 | 128 | 136 | 144 |

TABLE 2

| | | number-average molecular weight | example 5 | example 6 | example 7 | example 8 | comp. example 2 |
|---|---|---|---|---|---|---|---|
| component (A) | (A-1) | | 18 | 18 | 45 | 45 | 45 |
| component (B) | (B-1) | 900 | 54 | 45 | 22 | 9 | |
| component (F) | (F-1) | 370 | 28 | 37 | 33 | 46 | 55 |
| component (C) | (C-1) | | 8.0 | 8.0 | 8.0 | 8.0 | 8.0 |
| component (D) | (D-1) | | 5.7 | 5.7 | 5.7 | 5.7 | 5.7 |
| component (E) | (E-1) | | 4.3 | 4.3 | 4.3 | 4.3 | 4.3 |
| $G_{Ic}$ (J/m²) | | | 3070 | 2140 | 1340 | 1040 | 720 |
| G'-Tg (° C.) | | | 125 | 128 | 138 | 141 | 143 |

Method for Measuring Interlaminar Shear Strength of Fiber-Reinforced Plastic Each fiber-reinforced plastic panel obtained in later-described examples 16~21 was processed into a test piece (25 mm long×6.3 mm wide) in such a way that reinforcing fibers have an orientation angle of 0 degree to a long side of the test piece. Then, using a universal testing instrument (brand name: Instron 4465, made by Instron), the interlaminar shear strength of the fiber-reinforced plastic was measured. Using a three-point bending tool (load applicator R=3.2 mm, support R=1.6 mm) under conditions of temperature at 23° C. and relative humidity at 50%, the interlaminar shear strength (ILSS) was measured for each fiber-reinforced plastic. At that time, distance (L) between supports and thickness (d) of each test piece were set as follows: a ratio (L/d)=4, and a crosshead speed (rate per minute)=(L²×0.01)/(6×d).

TABLE 3

| | | number-average molecular weight | example 9 | example 10 | comp. example 3 |
|---|---|---|---|---|---|
| component (A) | (A-1) | | 45 | 27 | 27 |
| component (B) | (B-2) | 1200 | 22 | | |
| | (B-3) | 814 | | 36 | |
| component (F) | (F-1) | 370 | 33 | 37 | 37 |
| other epoxy resin (Z) | (Z-1) | 1100 | | | 36 |
| component (C) | (C-1) | | 8.0 | 8.0 | 8.0 |
| component (D) | (D-1) | | 5.7 | 5.7 | 5.7 |
| component (E) | (E-1) | | 4.3 | 4.3 | 4.3 |
| $G_{Ic}$ (J/m²) | | | 2140 | 1120 | 368 |
| G'-Tg (° C.) | | | 128 | 144 | 147 |

TABLE 4

| | | number-average molecular weight | example 11 | example 12 | example 13 | comp. example 4 | example 22 | example 23 | comp. example 5 | comp. example 6 |
|---|---|---|---|---|---|---|---|---|---|---|
| component (A) | (A-1) | | 45 | 45 | 45 | 45 | 14 | 14 | | |
| component (B) | (B-1) | 900 | | | | | 45 | 45 | 45 | 45 |
| | (B-2) | 1200 | 22 | 22 | 22 | 22 | | | | |
| component (F) | (F-1) | 370 | 33 | 33 | 33 | 33 | 41 | 41 | 41 | 41 |
| component (C) | (C-1) | | 5.4 | 8.0 | 11 | | 5.4 | | 5.4 | 5.4 |
| | (C-2) | | | | | | | 5.0 | | |
| other component (K) | (K-1) | | | | | 5.4 | | | | |
| component (D) | (D-1) | | 5.7 | 5.7 | 5.7 | 5.7 | 5.2 | 5.2 | 5.2 | 5.2 |
| component (E) | (E-1) | | 4.3 | 4.3 | 4.3 | 4.3 | 3.9 | 3.9 | 3.9 | 3.9 |
| other component (K) | (K-2) | | | | | | | | 1.0 | |
| | (K-3) | | | | | | | | | 14 |
| $G_{Ic}$ (J/m$^2$) | | | 1069 | 1297 | 1748 | 870 | 1610 | 1013 | 1720 | 1690 |
| G'-Tg (° C.) | | | 131 | 132 | 127 | 131 | 127 | 125 | 115 | 117 |

TABLE 5

| | | number-average molecular weight | example 14 | example 15 |
|---|---|---|---|---|
| component (A) | (A-1) | | 18 | 18 |
| component (B) | (B-1) | 900 | 45 | 45 |
| component (F) | (F-1) | 370 | 37 | 37 |
| component (C) | (C-1) | | 8.0 | 8.0 |
| component (D) | D-1) | | 5.7 | 5.7 |
| component (E) | (E-3) | | 4.3 | |
| | (E-2) | | | 4.3 |
| $G_{Ic}$ (J/m$^2$) | | | 1740 | 3130 |
| G'-Tg (° C.) | | | 135 | 125 |

Examples 16~21

Epoxy-resin compositions were prepared the same as in example 1 except that each example was set to have its respective components as shown in table 6.

Next, by setting the resin-film weight at such a rate that the resin content of a prepreg formed using two sheets of the film will be 38 mass %, each obtained epoxy-resin composition was coated on a release paper using a film coater under conditions of temperature at 65° C. Accordingly, each resin film was prepared.

On the resin-coated surface of each resin film, carbon fibers (brand name: TR50S, made by Mitsubishi Rayon) were wound using a drum winder to form a sheet with a fiber weight of 150 g/m$^2$. In addition, another resin film was laminated on the carbon-fiber sheet using the drum winder.

The carbon-fiber sheet sandwiched between two resin films was passed through a fusing press under conditions of temperature at 100° C., pressure at 0.4 MPa, and a feed rate at 1 m/min (brand name: JR-600S, made by Asahi Corporation, processing length of 1340 mm, cylinder pressure). Accordingly, a prepreg was obtained to have a fiber weight of 150 g/m$^2$ and a resin content of 38 mass %.

Then, 16 sheets of prepreg were laminated and kept in an autoclave oven under conditions of pressure at 0.6 MPa and temperature at 80° C. for 7 minutes after the temperature was raised at a programmed rate of 4° C./min. Then, the temperature was further raised at a programmed rate of 4° C./min to apply heat for curing the prepreg at 120° C. for 23 minutes. Accordingly, each fiber-reinforced plastic panel was obtained.

Using the aforementioned methods, G'-Tg, 0-degree flexural strength, 0-degree flexural modulus, and 0-degree flexural elongation under a maximum load, and interlaminar shear strength (ILSS) were measured. The results are shown in table 6.

TABLE 6

| | | number-average molecular weight | example 16 | example 17 | example 18 | example 19 | example 20 | example 21 |
|---|---|---|---|---|---|---|---|---|
| component (A) | (A-1) | | 18 | 45 | 31 | 27 | 18 | 14 |
| component (B) | (B-1) | 900 | 45 | 22 | 45 | 45 | 45 | 45 |
| component (F) | (F-1) | 370 | 37 | 33 | 24 | 28 | 37 | 41 |
| component (C) | (C-1) | | 8.0 | 11 | 5.4 | 8.0 | 5.4 | 5.4 |
| component (D) | (D-1) | | 5.7 | 5.7 | 5.7 | 5.7 | 5.2 | 5.2 |
| component (E) | (E-1) | | 4.3 | 4.3 | 4.3 | 4.3 | 3.9 | 3.9 |
| G'-Tg (° C.) | | | 121 | 129 | 122 | 122 | 120 | 120 |
| 0° flexural strength (MPa) | | | 2380 | 2240 | 2430 | 2240 | 2590 | 2550 |
| 0° flexural modulus (Gpa) | | | 125 | 123 | 123 | 122 | 123 | 124 |
| 0° flexural elongation under maximum load (%) | | | 2.28 | 2.04 | 2.41 | 2.13 | 2.40 | 2.33 |
| interlaminar shear strength (MPa) | | | 70.9 | 80.5 | 76.5 | 76.2 | 82.7 | 82.5 |

INDUSTRIAL APPLICABILITY

The epoxy-resin composition according to an embodiment of the present invention completely cures at a low temperature in a short period of time. In addition, when a fiber-reinforced plastic is produced using the epoxy-resin composition as a matrix resin, the fiber-reinforced plastic exhibits excellent mechanical characteristics, especially excellent fracture toughness. According to the embodiments of the present invention, molded products of fiber-reinforced plastics are produced at high yield and efficiency, and the molded products exhibit excellent mechanical characteristics for use in wide varieties of applications ranging from sports/leisure purposes such as golf club shafts to industrial uses such as aircraft.

What is claimed is:

1. An epoxy-resin composition, comprising:
   component (A): an epoxy resin comprising a monomer unit represented by formula (1) obtained by a process comprising reacting epoxy resin (X), which has an average 1.8 to 2.5 epoxy groups per molecule and has an epoxy equivalent of 500 or less, with amine compound (Y), which has at least one monomer unit represented by formula (1);
   component (B): a bifunctional epoxy resin with a number-average molecular weight of at least 600 but no greater than 1300, which does not have a monomer unit represented by formula (1);
   component (C): a triblock copolymer; and
   component (D): a curing agent:

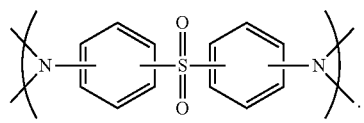

(1)

2. The epoxy-resin composition according to claim 1, wherein component (B) is a bisphenol-type bifunctional epoxy resin.

3. The epoxy-resin composition according to claim 1, wherein a content of component (A) is 3 to 55 mass % of a total mass of the epoxy resin in the epoxy-resin composition.

4. The epoxy-resin composition according to claim 1, wherein component (C) is a triblock copolymer of poly (methyl methacrylate)/poly(butyl acrylate)/poly(methyl methacrylate).

5. The epoxy-resin composition according to claim 1, wherein component (C) is a triblock copolymer copolymerized with dimethylacrylamide.

6. The epoxy-resin composition according to claim 5, wherein a polymerization proportion of dimethylacrylamide in the triblock compolymer copolymerized with dimethylacrylamide is 10 to 15 mass % in terms of polymerization material with respect to a total mass of the triblock copolymer copolymerized with dimethylacrylamide.

7. The epoxy-resin composition according to claim 1, wherein component (D) is dicyandiamide.

8. The epoxy-resin composition according claim 7, further comprising:
   component (E): a urea-based curing aid.

9. The epoxy-resin composition according to claim 1, further comprising:
   component (F): an epoxy resin which is a liquid form at 30° C.

10. The epoxy-resin composition according to claim 9, wherein component (F) does not have a monomer unit represented by formula (1) has a viscosity of 1000 Pa·s or lower at 30° C.

11. The epoxy-resin composition according to claim 10, wherein component (F) is a bisphenol A bifunctional epoxy resin.

12. The epoxy-resin composition according to claim 8, wherein component (E) is 3-phenyl-1, 1 -dimethylurea or toluene bis dimethyl urea.

13. The epoxy-resin composition according to claim 1, wherein with respect to a total mass of epoxy resin in the epoxy-resin composition,
    a content of component (A) is 3 to 55 mass %,
    a content of component (B) is 45 to 97 mass %,
    a total content of components (A) and (B) does not exceed 100 mass %,
    a content of component (C) is 4 to 11 parts by mass based on 100 parts by mass of the epoxy resin in the epoxy-resin composition, and
    component (D) is dicyandiamide and a content of dicyandiamide is 1 to 25 parts by mass based on 100 parts by mass of the epoxy resin in the epoxy-resin composition.

14. The epoxy-resin composition according to claim 9, wherein with respect to a total mass of epoxy resin in the epoxy-resin composition,
    a content of component (A) is 3 to 55 mass %,
    a content of component (B) is 8 to 55 mass %,
    a content of component (F) is 20 to 60 mass %,
    a total content of components (A), (B) and (F) does not exceed 100 mass %,
    a content of component (C) is 4 to 11 parts by mass based on 100 parts by mass of the epoxy resin in the epoxy-resin composition, and
    component (D) is dicyandiamide and a content of dicyandiamide is 1 to 25 parts by mass based on 100 parts by mass of the epoxy resin in the epoxy-resin composition.

15. The epoxy-resin composition according to claim 13, wherein component (D) is dicyandiamide, and the content of component (D) in the epoxy-resin composition is set so that a molar number of active hydrogen in dicyandiamide is 0.6 to 1.0 times a total molar number of epoxy groups in the epoxy resin in the epoxy-resin composition.

16. A film, comprising: the epoxy-resin composition according to claim 1.

17. A prepreg produced by a method comprising:
    impregnating reinforcing fiber material with the epoxy-resin composition according to claim 1.

18. A fiber-reinforced plastic, comprising: reinforcing fiber and a cured product of the epoxy-resin composition according to Claim 1.

19. The epoxy-resin composition according to claim 14, wherein component (D) is dicyandiamide, and the content of component (D) in the epoxy-resin composition is set so that a molar number of active hydrogen in dicyandiamide is 0.6 to 1.0 times a total molar number of epoxy groups in the epoxy resin in the epoxy-resin composition.

* * * * *